(12) United States Patent
Guan

(10) Patent No.: US 7,983,508 B2
(45) Date of Patent: Jul. 19, 2011

(54) METHOD AND APPARATUS FOR IMAGE PROCESSING CAPABLE OF EFFECTIVELY REDUCING AN IMAGE NOISE

(75) Inventor: Haike Guan, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 981 days.

(21) Appl. No.: 11/582,939

(22) Filed: Oct. 17, 2006

(65) Prior Publication Data

US 2007/0086674 A1    Apr. 19, 2007

(30) Foreign Application Priority Data

Oct. 18, 2005  (JP) .................................. 2005-303113
Sep. 19, 2006  (JP) .................................. 2006-253553

(51) Int. Cl.
*G06K 9/40*   (2006.01)
*G06K 9/38*   (2006.01)

(52) U.S. Cl. .......................... 382/275; 382/270; 382/254

(58) Field of Classification Search ........................ None
See application file for complete search history.

(56) References Cited

U.S. PATENT DOCUMENTS

| | | | | |
|---|---|---|---|---|
| 4,454,541 | A * | 6/1984 | Duschl | 348/125 |
| 5,841,477 | A * | 11/1998 | Kim | 375/240.24 |
| 6,737,625 | B2 * | 5/2004 | Baharav et al. | 250/208.1 |
| 7,054,503 | B2 * | 5/2006 | Ishikawa | 382/275 |
| 7,343,047 | B2 * | 3/2008 | Aas et al. | 382/255 |
| 7,388,609 | B2 * | 6/2008 | Pinto et al. | 348/246 |
| 7,480,420 | B2 * | 1/2009 | Wang | 382/274 |
| 7,683,948 | B2 * | 3/2010 | Yanof et al. | 348/246 |
| 7,756,355 | B2 * | 7/2010 | Kryda et al. | 382/275 |
| 2002/0196354 | A1 | 12/2002 | Chang et al. | |
| 2003/0228067 | A1 * | 12/2003 | Miyake et al. | 382/275 |
| 2004/0032516 | A1 * | 2/2004 | Kakarala | 348/246 |
| 2004/0196408 | A1 * | 10/2004 | Ishikawa et al. | 348/616 |
| 2005/0010621 | A1 * | 1/2005 | Pinto et al. | 708/200 |

(Continued)

FOREIGN PATENT DOCUMENTS

EP    1261197 A1   11/2002

(Continued)

OTHER PUBLICATIONS

Translation for EP 1343311 (Note, EP 1343311 was provided with IDS).*

(Continued)

*Primary Examiner* — Vikkram Bali
*Assistant Examiner* — Michelle Entezari
(74) *Attorney, Agent, or Firm* — Blakely, Sokoloff, Taylor & Zafman, LLP

(57) ABSTRACT

A noise eliminating device may include a noise eliminating mechanism that eliminates an isolated noise in an image being photographed. The noise eliminating mechanism may include a noise pixel detection mechanism and a pixel correction mechanism. The noise pixel detection mechanism may detect a noise pixel by scanning the image. The pixel correction mechanism may correct a level of a detected noise pixel based on a level of a pixel located in a predetermined area from the noise pixel. A noise eliminating method for eliminating an isolated noise in an image being photographed may include detecting a noise pixel by scanning the image and correcting a level of the detected noise pixel based on a level of a pixel located in a predetermined area away from the noise pixel.

18 Claims, 6 Drawing Sheets

U.S. PATENT DOCUMENTS

2005/0035977 A1* 2/2005 Yokoyama et al. ........... 345/611
2005/0276510 A1* 12/2005 Bosco et al. .................. 382/275

FOREIGN PATENT DOCUMENTS

| EP | 1343311 A2 | 9/2003 |
| JP | H11-018012 | 1/1999 |
| JP | 2001 211388 A | 8/2001 |
| JP | 3605084 | 9/2003 |
| JP | 2003-298952 | 10/2003 |
| JP | 2004-015191 | 1/2004 |

OTHER PUBLICATIONS

European Search Report for European Patent Application No. EP 06 25 5312, dated Jun. 17, 2009, 6 pages.

* cited by examiner

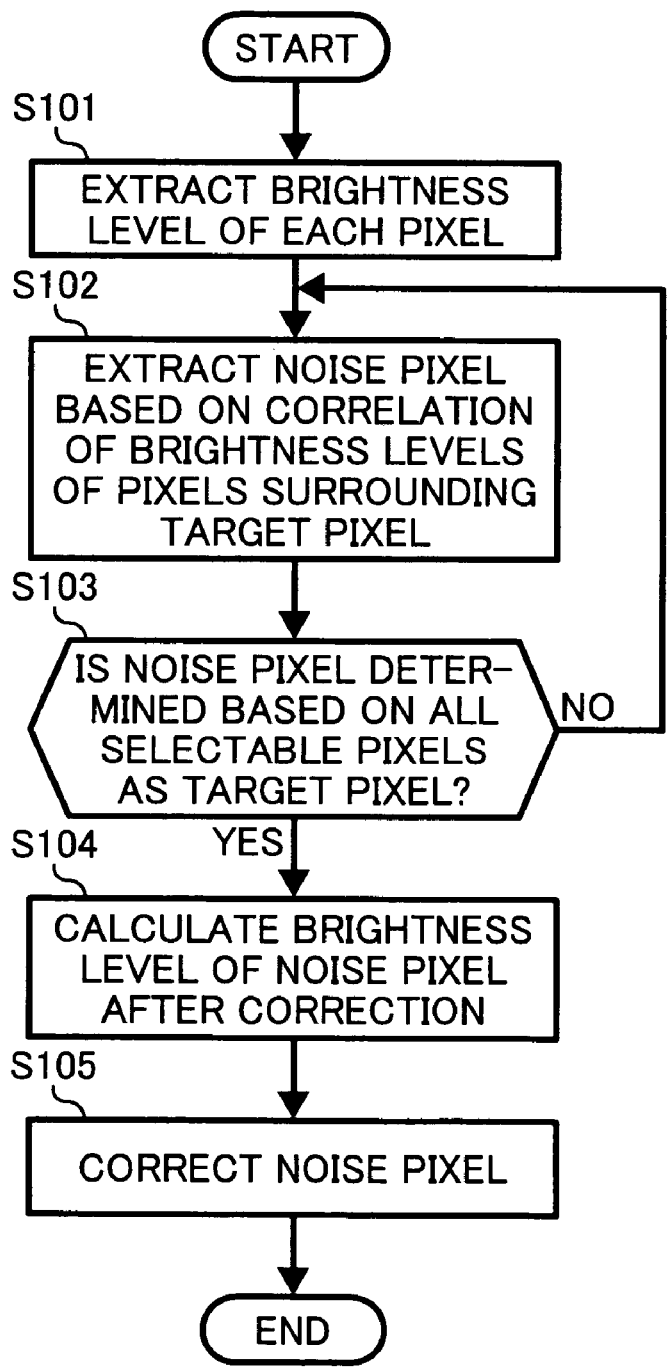

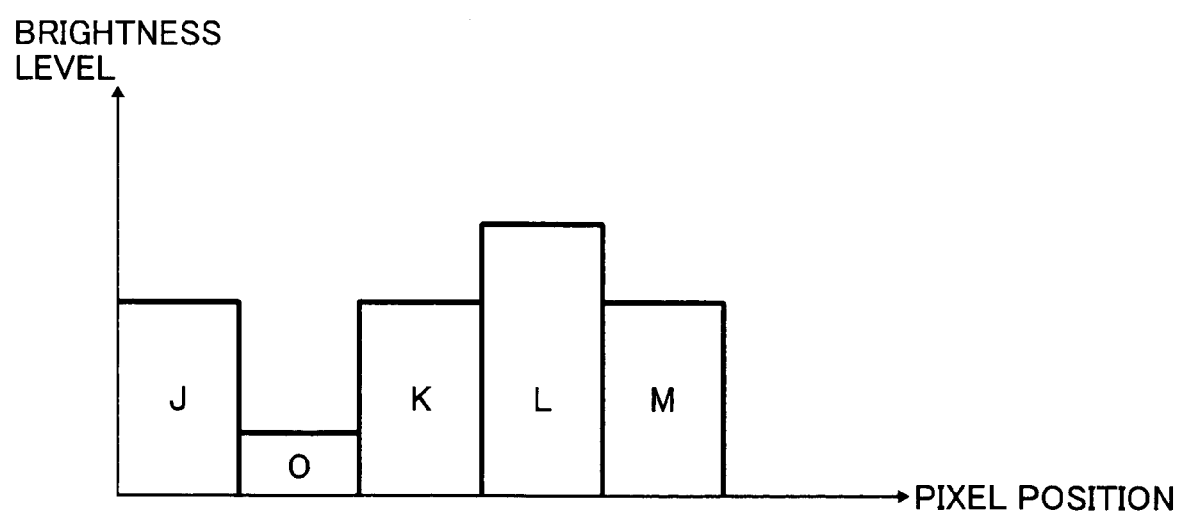

FIG. 7

|  | D ($I_D$) |  |  |
|---|---|---|---|
| A ($I_{A2}$) | O ($I_{O2}$) | B ($I_{B2}$) |  |
| A ($I_{A1}$) | O ($I_{O1}$) | B ($I_{B1}$) |  |
|  | C ($I_G$) |  |  |

FIG. 8

|  | D ($I_D$) |  |  |
|---|---|---|---|
| A ($I_{A3}$) | O ($I_{O3}$) | B ($I_{B3}$) |  |
| A ($I_{A2}$) | O ($I_{O2}$) | B ($I_{B2}$) |  |
| A ($I_{A1}$) | O ($I_{O1}$) | B ($I_{B1}$) |  |
|  | C ($I_G$) |  |  |

| R ($I_{R1}$) | G | R ($I_{R2}$) | G |
| --- | --- | --- | --- |
| G | B | G | B |
| R ($I_{R3}$) | G | R | G |
| G | B | G | B |

METHOD AND APPARATUS FOR IMAGE PROCESSING CAPABLE OF EFFECTIVELY REDUCING AN IMAGE NOISE

PRIORITY

This patent specification is based on Japanese patent application, No. JP2005-303113 filed on Oct. 18, 2005 and No. JP2006-253553, filed on Sep. 19, 2006 in the Japan Patent Office, the entire contents of each of which are incorporated herein by reference.

BACKGROUND

1. Field

Exemplary embodiments of the present invention relate to a method, a program and an apparatus for image processing, and more particularly to a method, a program and an apparatus for image processing capable of effectively reducing image noise.

2. Discussion of the Background

When taking pictures with an imaging apparatus in the dark, the duration of exposure is forced to be long. In such a condition, a noise or an isolated noise which is isolated due to dark current, a noise in an electric circuit, a temperature and so forth may easily be generated. In particular, when the duration of exposure is more than 60 seconds, a number of isolated noises are generated. Thus, a noise eliminating method using a shade difference method is frequently used. However, this noise eliminating method has a downside in which a black spot is generated in a saturated pixel. Moreover, the dark exposure is necessary for the same period of time as that of the exposure. When exposing for 180 seconds, an exposure of 360 seconds will be necessary, and it is not realistic. A median filtering method may also be used. However, when exposing for more than 60 seconds, the number of noises significantly increases, thereby increasing demands for applying a strong median filter. The side effect of this is that an edge of the image becomes blurry. Therefore, related arts have proposed techniques for reducing or eliminating isolated noises.

For example, Japanese Patent Laid-Open Application Publication No. 2004-015191 proposes a noise eliminating method in which location information of the noise generated on a CCD is stored in a memory region in advance so that the noise is eliminated using the stored location information of the noise with respect to an acquired image. Japanese Patent Laid-Open Application Publication No. 2003-298952 proposes a noise eliminating method, in which when shooting by a digital camera, a shutter is closed in order to perform an exposure for the same period of time as that of a shooting exposure, and the data of dark current is stored. Using the photographed image and the dark current image, the noise is eliminated. Japanese Patent Laid-Open Application Publication No. 3605084 proposes a noise eliminating method in which a shutter is closed, and the exposed image is subtracted from an image photographed under the same exposure conditions. Japanese Patent Laid-Open Application Publication No. Hei 11-018012 proposes a noise eliminating method using the linearity of four consecutive pixels. In this method, a noise is detected and corrected without storing the noise information.

In the related art, according to Japanese Patent Laid-Open Application Publication No. 2004-015191, the location information of the noise is stored in advance, and noise elimination is performed on the photographed image using the location information of the noise. However, in this noise eliminating method, the location information of the noise needs to be stored. Consequently, the noise may not be eliminated in a short period of time. Furthermore, if the storage condition is the same, a favorable noise elimination result may be obtained. However, if the shooting conditions such as the exposure time and the temperature are changed, the noise conditions may also be changed, thereby making it difficult to accurately eliminate noises.

In the related arts, according to Japanese Patent Laid-Open Application Publication No. 2003-298952 and No. 3605084, a noise is eliminated by storing the dark current data and by subtracting an image equivalent of the dark current from the photographed image. However, in a case where shooting conditions are changed, the dark current may also be changed accordingly. Therefore, it is necessary to store a plurality of image data and to equip with a large memory region. In a case where the image has a saturated pixel, a defective pixel having a black spot is generated, when performing subtraction. Furthermore, in a case of a long exposure time, twice the exposure time may be necessary. Consequently, the noise may not be eliminated in a short period of time, causing a number of problems such as a burden to a user.

In the related arts, according to Japanese Patent Laid-Open Application Publication No. Hei 11-018012, a noise is detected and is corrected using the linearity of four consecutive pixels from the photographed image. However, in a case where the number of noises increases depending on shooting conditions, it may be possible to generate a consecutive isolated noise which is formed of a group of a plurality of pixels. Consequently, the noise may not completely be eliminated. In addition, the processing speed decreases in this method. Therefore, there will be a need for a designated hardware. If there is no designated hardware, there may be a problem in which noise may not be eliminated in a short period of time.

SUMMARY OF THE INVENTION

A method and apparatus for image processing capable of effectively reducing an image noise are described. In one embodiment, a noise eliminating device, comprising: a noise eliminating mechanism to eliminate an isolated noise in an image being photographed, where the noise eliminating mechanism includes a noise pixel detection mechanism to detect a noise pixel by scanning the image; and a pixel correction mechanism to correct a level of a detected noise pixel based on a level of a pixel located in a predetermined area with respect to the noise pixel.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein:

FIG. 4 is a flowchart showing an exemplary procedure of noise eliminating processing of a first exemplary embodiment of the present invention;

FIG. 5 is a diagram for illustrating a noise elimination in a single pixel searching area according to a first exemplary embodiment;

FIG. 6 is a diagram for illustrating a noise detection according to a second exemplary embodiment;

FIG. 7 is a diagram for illustrating a noise elimination according to a third exemplary embodiment;

FIG. 8 is a diagram for illustrating another noise elimination according to the third exemplary embodiment;

DETAILED DESCRIPTION OF EXEMPLARY EMBODIMENTS

Figure 1:
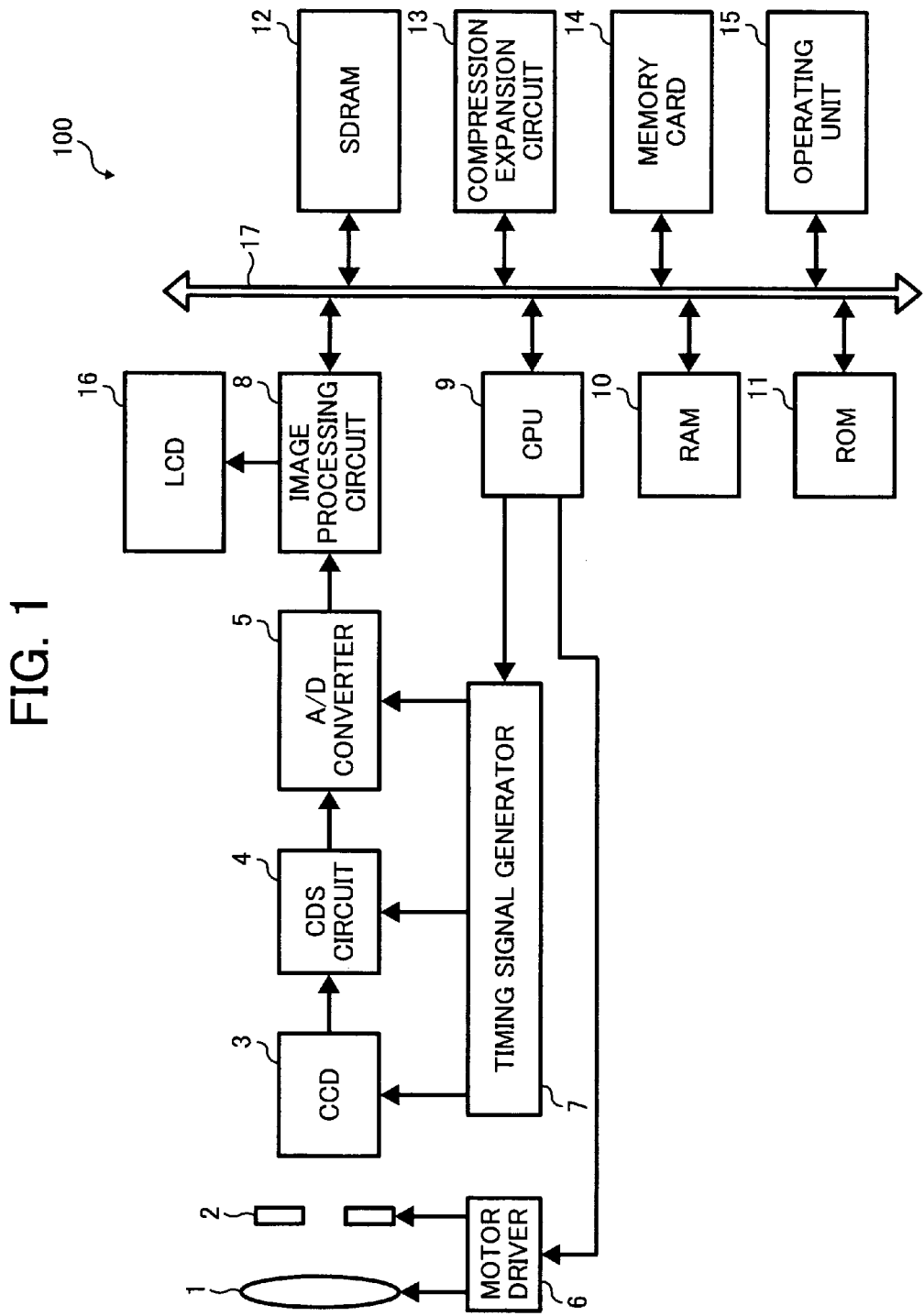
FIG. 1 is a block diagram illustrating a structure of an imaging device (e.g. digital camera) of one exemplary embodiment of the present invention.

In view of the foregoing, exemplary embodiments of the present invention include a novel imaging apparatus, a method and a program for detecting noise in a photographed image and eliminating the noise by correcting the level of the noise pixel with the level of pixels surrounding the detected noise pixel. Accordingly, the isolated noise may be eliminated in a short period of time and may assuredly be eliminated.

To achieve the above and other embodiments, in one exemplary embodiment, a novel noise eliminating device includes a noise eliminating mechanism that eliminates an isolated noise in an image being photographed. The noise eliminating mechanism includes a noise pixel detection mechanism and a pixel correction mechanism. The noise pixel detection mechanism detects a noise pixel by scanning the image. The pixel correction mechanism corrects a level of a detected noise pixel based on a level of a pixel located in a predetermined area with respect to the noise pixel.

In one exemplary embodiment of the noise eliminating device, the noise pixel detection mechanism detects a target pixel as the noise pixel, when a difference between a level of the target pixel and the level of the pixel located in the predetermined area away from the target pixel is greater than a first preset threshold level, and when a difference between the levels of pixels surrounding the target pixel is smaller than a second preset threshold level.

In one exemplary embodiment of the noise eliminating device, the pixel correction mechanism corrects the noise pixel level using a mean value of the levels of a plurality of pixels located in the predetermined area with respect to the noise pixel.

In one exemplary embodiment of the noise eliminating device, the noise pixel detection mechanism defines the predetermined area based on shooting conditions at the time when the image is photographed.

In one exemplary embodiment of the noise eliminating device, the shooting conditions includes at least one of an exposure time and a temperature at the time of shooting, and the sensitivity of an imaging device.

To achieve the above and other embodiments, in one exemplary embodiment, a noise eliminating method for eliminating an isolated noise in an image being photographed includes detecting a noise pixel by scanning the image and correcting a level of the detected noise pixel based on a level of a pixel located in a predetermined area with respect to the noise pixel.

In one exemplary embodiment of the noise eliminating method, detecting the noise pixel detects a target pixel as the noise pixel, when a difference between a level of the target pixel and the level of the pixel located in the predetermined area away from the target pixel is greater than a first preset threshold level, and when a difference between the levels of pixels surrounding the target pixel is smaller than a second preset threshold level.

In one exemplary embodiment of the noise eliminating method, correcting the level of the detected noise pixel corrects the noise pixel level using a mean value of the levels of a plurality of pixels located in the predetermined area with respect to the noise pixel.

In one exemplary embodiment of the noise eliminating method, detecting the noise pixel defines the predetermined area based on shooting conditions at the time when the image is photographed.

In one exemplary embodiment of the noise eliminating method, the shooting conditions include at least one of an exposure time and temperature at the time of shooting, and sensitivity of an imaging device.

To achieve the above and other embodiments, in one exemplary embodiment, a computer program product for detecting and eliminating a noise pixel, stored on a computer readable storage medium, execute a method comprising detecting a noise pixel by scanning the image and correcting a level of the detected noise pixel based solely on a level of a pixel located in a predetermined area with respect to the noise pixel.

In one exemplary embodiment of the computer program product, detecting the noise pixel detects a target pixel as the noise pixel, when a difference between the level of the target pixel and the level of the pixel located in the predetermined area away from the target pixel is greater than a first preset threshold level, and when a difference between the levels of pixels surrounding the target pixel is smaller than a second preset threshold level.

In one exemplary embodiment of the computer program product, correcting the level of the detected noise pixel corrects the noise pixel level using a mean value of the levels of a plurality of pixels located in the predetermined area with respect to the noise pixel.

In one exemplary embodiment of the computer program product, the detecting step may define the predetermined area based on shooting conditions at the time when the image is photographed.

In one exemplary embodiment of the computer program product, the shooting conditions include at least one of an exposure time and temperature at the time of shooting, and sensitivity of an imaging device.

The terminology used herein is for the purpose of describing particular embodiments only and is not intended to be limiting of the present invention. As used herein, the singular forms "a", "an", "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. For the sake of simplicity of drawings and descriptions, the same reference numerals are given to materials and constituent parts having the same functions, and descriptions thereof will be omitted unless otherwise stated. Exemplary embodiments of the present invention are now explained below with reference to the accompanying drawings. Referring now to the drawings, wherein like reference numerals designate identical or corresponding parts throughout the several views, particularly to FIG. 1, an imaging apparatus (e.g., digital camera) 100, according to an exemplary embodiment of the present invention, is explained.

A description of a first exemplary embodiment of the present invention will be given as follows. FIG. 1 is a block diagram illustrating a structure of the imaging apparatus 100, according to an exemplary embodiment of the present invention. The imaging apparatus 100 includes: an optical imaging system 1, a mechanical shutter 2, a CCD 3, a CDS circuit 4, an A/D converter 5, a motor driver 6, a timing signal generator 7, an image processing circuit 8, a CPU 9, a RAM 10, a ROM 11, an SDRAM 12, a compression expansion circuit 13, a memory card 14, an operating unit 15, a liquid crystal display 16 (hereinafter referred to as an LCD 16). The optical imaging system 1 has a plurality of lenses. The mechanical shutter 2 cuts off an incident light to the CCD 3. The CCD 3 converts an optical image imaged on an imaging area into an electric signal and outputs the electric signal as analog image data. The CDS circuit 4 eliminates noise components contained in the image data output from the CCD 3. The A/D converter 5 then converts the data into a digital value. The motor driver 6 drives the optical imaging system 1 and the mechanical shutter 2. The timing signal generator 7 provides the CCD 3, the CDS circuit 4 and the A/D converter 5 with clock signals. The image processing circuit 8 serves as a mechanism for YUV conversion processing and image processing to perform various kinds of image processing, such as white balance control processing, contrast correction processing, edge enhancing correction, color conversion processing and so forth. The CPU 9 performs various kinds of computations in accordance with a program. The work area is used. The RAM 10 includes a work area used in the course of various processing and storage areas for storing various kinds of data, and is readable and writable. The ROM 11 is a read-only memory which stores programs and the like. The SDRAM 12 temporarily stores the image data. The compression/expansion circuit 13 compresses and outputs the image data output from the image processing circuit 8, to the memory card 14, while expanding and outputting the image data read out from the memory card 14 to the image processing circuit 8. The memory card 14 stores the compressed image data. The operating unit 15 is provided for the operator to operate the imaging apparatus. The LCD 16 displays the image data having been subjected to signal or image processing.

As shown in FIG. 1, the light reflected from a subject first enters the CCD 3 through the optical imaging system 1. Between the optical imaging system 1 and the CCD 3, the mechanical shutter 2 is disposed in order to cut off the incident light to the CCD 3. The optical imaging system 1 and the mechanical shutter 2 are driven by the motor driver 6. The above-described CCD 3 converts an optical image imaged on the imaging area into the electric signal and outputs the electric signal as analogue image data. The CDS circuit 4 eliminates noise components from the image data output from the CCD 3. The image data is then converted into the digital value by the A/D converter 5 and is output to the image processing circuit 8.

The image processing circuit 8 serves as a mechanism for YUV conversion processing and image processing using the SDRAM 12 which temporarily stores the image data to perform various kinds of image processing, such as the white balance control processing, the contrast correction processing, the edge enhancing processing, the color conversion processing and so forth. The white balance control processing adjusts color intensity of the image data. The contrast correction processing adjusts the contrast of the image data. The edge enhancing processing adjusts sharpness of the image data. The color conversion processing adjusts hues of the image data. The image processing circuit 8 causes the LCD 16 to display the image data to which the signal processing or the image processing is performed. The image data to which the signal processing or the image processing is performed is stored in the memory card 14 through the compression/expansion circuit 13. The compression/expansion circuit 13 compresses and outputs the image data output from the image processing circuit 8 to the memory card 14, while expanding and outputting the image data read from the memory card 14 to the image processing circuit 8. The timing of the above-described CCD 3, the CDS circuit 4, and the A/D converter 5 is controlled by the CPU 9 through the timing signal generator 7 which generates the timing signals. The image processing circuit 8, the compression/expansion circuit 13 and the memory card 14 are also controlled by the CPU 9. The CPU 9 performs various kinds of computations in accordance with respective programs. The ROM 11 which is a read-only memory that stores programs, the work area used in the course of various kinds of processing, the RAM 10 which has storage areas for various kinds of data and is readable and writable, and so forth, are built into the CPU 9 and are interconnected by a bus line 17.

When the noise eliminating processing is performed in the imaging apparatus 100, the noise eliminating program is loaded on the RAM 10 by a system controller (not shown) and performed. The noise eliminating program enters, through the system controller, parameters which indicate an exposure time at the time of shooting, a CCD sensitivity and whether or not continuous shooting takes place. The noise eliminating program reads setting conditions for the optimum noise elimination corresponding to the parameters from the ROM 11 in order to perform the noise eliminating processing. The image subjected to the noise eliminating processing is temporarily stored in the SDRAM 12. The noise eliminating processing is performed with respect to the stored image.

With reference to FIG. 1, the imaging apparatus of one exemplary embodiment of the present invention is explained. However, embodiments of the present invention relate to a noise eliminating device, and an imaging mechanism such as a CCD may not be necessary. When the imaging mechanism is not provided, the present invention is executable as long as an input mechanism for inputting an image as a processing subject and a later described shooting condition parameter input mechanism are provided. As is well known to those skilled in the art, a detail description of the minimum mechanisms necessary for the present invention, selected from the imaging apparatus as shown in FIG. 1 will be omitted.

Figure 2:
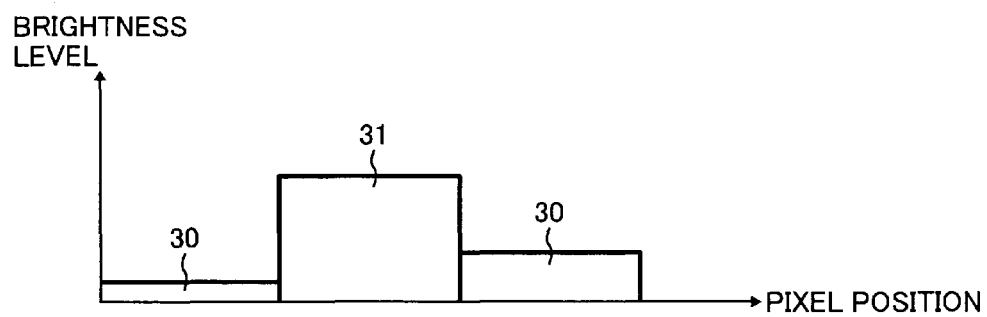
FIG. 2 is a diagram illustrating one example of a bright-spot model.
Figure 3:
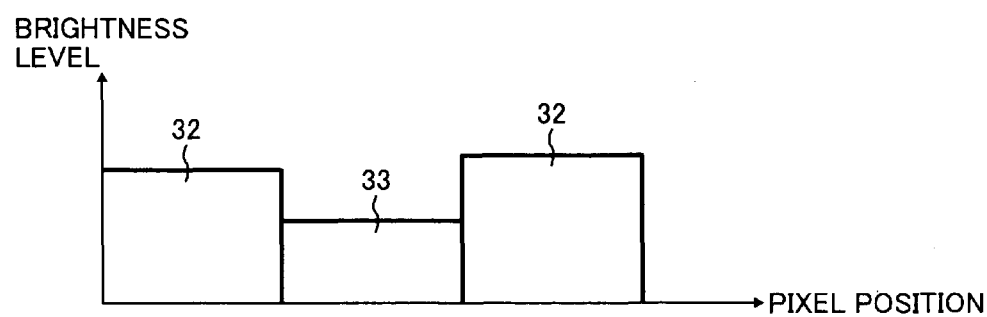
FIG. 3 is a diagram illustrating one example of a black-spot model.

With reference to FIGS. 2, 3 and 5, noise eliminating processing of a first exemplary embodiment is explained along with a flowchart in FIG. 4. First, in Step S101, a pixel having noise is detected from an image to be processed. The noise pixel is detected by scanning the image to be processed and by extracting a brightness level of pixels which form the image.

Next, in Step S102, the noise pixel is detected based on a correlation of the brightness levels extracted from a plurality of consecutive pixels in the image. The correlation may be defined as a noise model explained as follows. The correlation herein refers to a correlation between one pixel in the image (hereinafter referred to as a target pixel O) and specific pixels surrounding the target pixel O.

FIG. 2 illustrates the correlation of the brightness levels extracted from three consecutive pixels. In FIG. 2, the target pixel O is represented as the pixel 31 located in the center. A reference numeral 30 represents a normal pixel. With reference to FIG. 2, the brightness level of the target pixel O has a greater value than that of the brightness levels extracted from pixels 30 located on sides of the target pixel O or the pixel 31. Such a correlation may be defined as a bright-spot model.

FIG. 3 also illustrates the correlation of the brightness levels extracted from three consecutive pixels. In FIG. 3, the target pixel O is represented as the pixel 33 located in the center. A reference numeral 32 represents a normal pixel. As opposed to FIG. 2, in FIG. 3, the brightness level of the target pixel O has a lower value than that of the brightness levels extracted from pixels 32 located on sides of the target pixel O or the pixel 33. Such a correlation may be defined as a black-spot model.

FIG. 5 illustrates a noise detection when a search field is a single pixel. In FIG. 5, the brightness level of the target pixel O is $I_O$, and the brightness levels of the surrounding pixels A, B, C and D are represented as $I_A$, $I_B$, $I_C$ and $I_D$ respectively. The target pixel O is determined to be the noise of the above-described bright-spot model, when the brightness level $I_O$ of the target pixel O is greater than the brightness levels $I_A$ and $I_B$, and the difference is greater than a preset threshold level 1 based on the brightness levels $I_A$ and $I_B$ of the respective pixels A and B located on the sides of the target pixel O, and the brightness level $I_O$ of the target pixel O. On the other hand, when the brightness level $I_O$ is smaller than the brightness levels $I_A$ and $I_B$, and the difference is greater than a preset threshold level 2, the target pixel O is determined to be the noise of the above-described black-spot model.

In Step S103, whether or not the pixel is a noise pixel is determined based on all the selectable pixels in the image as the target pixel.

In a case where the noise is detected based on the above-described processing, the brightness level of the pixel detected as the noise is corrected. In the first exemplary embodiment, in Step S 104, the brightness level of the target pixel O after correction, which is detected as the noise, is calculated by using an equation 1 using the brightness levels $I_A$ and $I_B$ Of the respective pixels A and B located on the sides of the target pixel O.

$$I'_O = (I_A + I_B)/2 \quad \text{[Equation 1]}$$

Subsequently, in Step S105, the noise elimination in the image to be processed is completed, when the brightness level after correction is calculated for all of the noise pixels, and the noise pixels are corrected using the calculated brightness level.

As expressed in Equation 1, the brightness level of the target pixel O after correction is determined not by the original brightness level of the target pixel, but is determined by the brightness level of the surrounding pixels or the pixels in a predetermined area. Consequently, in a case where the target pixel O detected as the noise pixel is located on an edge of the image, for example, correction may appropriately be performed. Furthermore, the noise may be eliminated in a short period of time and may assuredly be eliminated.

Furthermore, in a case where the difference between the brightness levels $I_A$ and $I_B$ is greater than the preset threshold level 3, the target pixel O is not detected as a noise. Accordingly, in a case where the target pixel O is located on the edge of the image and is not a noise, it is more assuredly prevented that the target pixel O is erroneously detected as the noise. As a result, it is made possible to assuredly eliminate the noise. The threshold levels 1 through 3 are not limited to a predetermined value. Needless to say, the threshold levels 1 through 3 may be modified depending on a situation.

In the first exemplary embodiment, when whether or not the target pixel O is a noise pixel is determined, merely the brightness level of pixels in a column, such as the target pixel O, the pixel A and the pixel B are taken into consideration. However, not only the brightness level of the pixels in the column, but also the brightness level of the pixels in a vertical line, such as the target pixel O, the pixel C and the pixel D or the brightness level of the pixels in a diagonal line such as the pixels E and F, or the pixels G and H may be taken into consideration, when determining whether or not the target pixel O is a noise pixel. Further, the combination of both brightness levels of the pixels in the vertical and diagonal lines described above may be taken into consideration when determining whether or not the target pixel O is a noise pixel. In a case where the target pixel O is determined as the noise pixel, the brightness level of the target pixel O after correction may be obtained.

In a case where image data of the SDRAM 12 includes RAW data of a single CCD and the RGB as shown in FIG. 8, the noise eliminating processing may be performed between the pixels of the same color in a horizontal and vertical direction. That is, for example, in a case where the noise of $I_{R1}$ in FIG. 9 needs to be eliminated, the noise eliminating processing is performed between the pixel $I_{R2}$ which is the same color pixel as the pixel $I_{R1}$ in the horizontal direction, and the pixel $I_{R3}$ which is the same color pixel as the pixel $I_{R1}$ in the vertical direction. The letters R and G refer to the color of each pixel.

In the first embodiment, merely the level of the brightness level is noted as a level of a pixel. However, the present invention may be applicable for other values of the pixel. The same may be said of a later described second and third exemplary embodiment of the present invention.

In a second exemplary embodiment of the present invention, the configuration may be the same as that of the first exemplary embodiment. However, a noise pixel detection method may be different.

In the first exemplary embodiment, as shown in FIG. 2 and FIG. 3, the search field is four neighboring pixels or eight neighboring pixels from the target pixel O. However, the noise generated in the image may vary depending on shooting conditions such as the temperature, a (exposure) time, shooting modes, and so forth at the time when the image is taken. In the second exemplary embodiment, the noise pixel may be detected by expanding the search field according to the shooting conditions at the time when the image is taken.

FIG. 6 illustrates the detection of the noise pixel based on the brightness levels of five consecutive pixels J, K, L, M and O. The pixel O in FIG. 6 is a noise pixel. When detecting a noise, a mean value of the brightness levels of the five consecutive pixels is calculated. Then, the calculated mean value of the brightness levels and the brightness levels of each of the five pixels are compared. If, as a result of comparison, the brightness levels of each of the five pixels are greater than the calculated mean value of the brightness levels and the preset threshold level 1, the compared pixels are detected as the noise of the bright-spot model. On the other hand, when compared with the above-described mean value, if the brightness levels of each of the five pixels are smaller than the preset threshold level 2, the compared pixels are detected as the noise of the black-spot model.

With respect to the pixel detected as the noise, the brightness level of the pixel is corrected by the similar processing to the processing of the first exemplary embodiment performed on the target pixel O detected as the noise pixel.

Generally, when the temperature is relatively high, the amount of noise increases. It is known from the empirical rule that the noise ranging from a small size to a large size may exist. In such a case, if the noise search field is expanded, a pixel, which may not be detected as the noise based on the brightness levels of the four or eight neighboring pixels, may be able to be detected as the noise. Thus, more accurate noise elimination may be possible. In the meantime, if a noise processing speed needs to be enhanced, the search field may be reduced, thereby making it possible to enhance the processing speed.

The noise detecting method and noise processing method of the second exemplary embodiment are described above. However, examples of the noise detecting method and noise processing method in the second exemplary embodiment are not limited to the above-described methods. For example, it may be possible to detect the noise by using the methods of the first exemplary embodiment. In particular, after the search field is set, one of the pixels in the search field is set as the target pixel O. In a case where the brightness level of the target pixel O is greater than the preset threshold level 1 when compared with the brightness levels of other pixels in the search field, the target pixel O is detected as the noise of the bright-spot model. In a case where the brightness level of the target pixel O is less than the preset threshold level 2, the target pixel O is determined as the noise of the black-spot model. If the above-described correlation may be found between the target pixel O and at least one pixel, the target pixel O may be detected as the noise. Alternatively, if the above-described correlation may be found between the target pixel O and all other pixels in the search field, the target pixel O may be detected as the noise.

Furthermore, in a case where the target pixel O is determined not as the noise pixel when compared with the brightness levels of the four or eight neighboring pixels from the target pixel O, a decision as to whether or not the target pixel O is the noise pixel may be made assuming one of the four or eight neighboring pixels is a pixel departed from the target pixel.

Referring now to FIG. 6, whether or not the target pixel O is the noise pixel is determined using the brightness level of the target pixel O, and the brightness levels of the pixels J and K. In a case where the target pixel O is determined as the noise pixel, the subsequent processing may follow the same procedures as that of the first exemplary embodiment. On the other hand, in a case where the target pixel O is determined not as the noise pixel, whether or not the target pixel O is the noise pixel is determined using the brightness levels of the pixels J and L. Furthermore, in a case where the target pixel O is determined not as the noise pixel when using the brightness levels of the pixels J and L, whether or not the target pixel O is the noise pixel is determined using the brightness levels of pixels J and M.

In other words, in the first exemplary embodiment, whether or not the target pixel O is the noise pixel is determined using the brightness levels of four or eight neighboring pixels (in FIG. 6, the pixels A and B) from the target pixel O. In a case where the target pixel O is determined not as the noise pixel, the search field may be expanded. If an upper limit of the search field is set in accordance with shooting conditions, expedient noise elimination may be assured.

The noise detection method of the first exemplary embodiment may be performed in conjunction with the second exemplary embodiment.

In a third exemplary embodiment, the configuration may be the same as that of the first exemplary embodiment. However, in the third exemplary embodiment, a plurality of pixels may simultaneously be selected as the target pixel in accordance with shooting conditions.

In the third exemplary embodiment, similarly to the second embodiment, the noise pixel detecting method may vary depending on the shooting conditions. However, in the third exemplary embodiment, the number of target pixels may be variable depending on the shooting conditions, whereas the search field may be variable depending on the shooting conditions in the second exemplary embodiment.

Generally, in a case where the exposure time is short or the temperature is low, most noise pixels may be isolated. On the other hand, it is known from the empirical rule that when the exposure time is long, the temperature rises, and the number of isolated noise pixels (hereinafter referred to as consecutive isolated noise) formed of a group of a plurality of pixels increases. Consequently, considering such a case, a plurality of pixels may simultaneously be selected as the target pixel depending on the shooting conditions.

First, a noise pixel is detected from an image to be processed. To detect the noise pixel, the image to be processed is scanned in order to extract the brightness levels of the pixels that form the image.

Next, in a case where two consecutive isolated noises are eliminated, two consecutive pixels are considered as one target pixel, and whether or not the target pixel is the noise pixel is determined. In this case, a mean value of the brightness levels of the two pixels forming the target pixel may be referred to as the brightness level of the target pixel. The brightness level of the pixel, which is higher than that of the other pixel, may also be referred to as the brightness level of the target pixel. Alternatively, the brightness level of the pixel, which is lower than that of the other pixel, may also be referred to as the brightness level of the target pixel. In a case where three consecutive isolated noises are eliminated, similarly to the above-described elimination of the two consecutive isolated noises, three consecutive pixels are considered as one target pixel, and whether or not the target pixel is the noise pixel may be determined.

A method to determine whether to eliminate two consecutive isolated noises or three consecutive isolated noises may vary depending on the shooting conditions. A method to determine the brightness level of the target pixel may vary depending on the shooting conditions.

Next, a detail description will be given of ways in which consecutive isolated noises are eliminated with respect to the detected consecutive isolated noises. In a case where two consecutive isolated noises of FIG. 7 are eliminated, it is necessary to determine the noises in two pixels. First, the pixel level of the noise pixel $I_{O1}$ is corrected using Equation 1. Then, the pixel level of the noise pixel $I_{O2}$ is corrected using Equation 1.

FIG. 8 illustrates ways in which three consecutive isolated noises are eliminated. First, the pixel level of the noise pixel $I_{O1}$, is corrected using Equation 1. Then, the pixel level of the noise pixel $I_{O2}$ is corrected using Equation 1. Lastly, the pixel level of the noise pixel $I_{O3}$ is corrected using Equation 1.

The detail description is given of the third exemplary embodiment above. Similarly to the second exemplary embodiment, the first or the second exemplary embodiments may be used in conjunction with the third exemplary embodiment.

In the second and third exemplary embodiments, ways in which a noise may be eliminated, may vary depending on the shooting conditions. In addition, the threshold levels 1 through 3 may be set depending on the shooting conditions. Furthermore, parameters for each shooting condition may be stored in advance. An optimum value of the noise eliminating parameter may be set according to the characteristics of CCD, or an optimum noise eliminating parameter may empirically be measured. Subsequently, the obtained optimum parameter may be stored in the ROM 11 so that the processing speed may be enhanced.

Furthermore, when setting up the parameter, processing time may be long if the search field is large. Thus, the parameter may be set taking shooting modes into consideration. In addition, the parameter may be set while taking the characteristics into consideration that the smaller the threshold levels 1 and 2 are, the more enhanced noise elimination may be, and that the greater the threshold level 3 is, the more noises in the vicinity of the edge may be eliminated. Needless to say, the optimum parameter set in a manner as described above may be stored in the ROM 11 so that the processing speed may be enhanced. The ROM 11 may be disposed outside the noise eliminating device of the embodiments of the present invention. The optimum parameter may be input from the ROM 11 disposed outside.

Figures 9, 10:
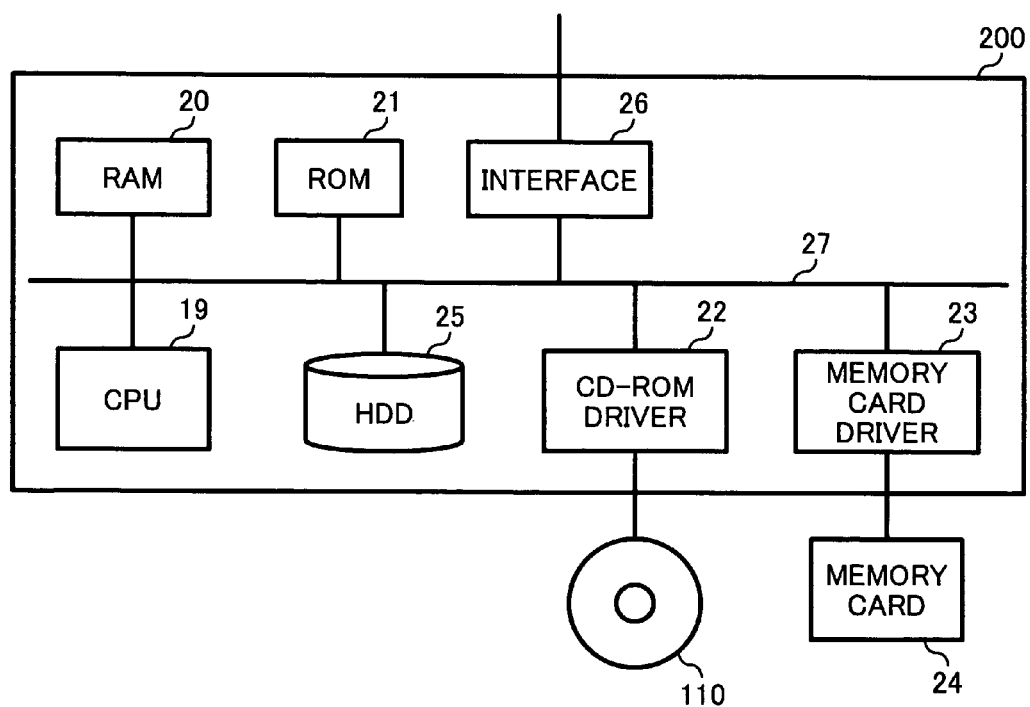
FIG. 9 is a diagram illustrating a pixel sequence of a single CCD.
FIG. 10 is a block diagram illustrating a structure of a noise elimination device.

FIG. 10 is a block diagram of a noise eliminating device of one exemplary embodiment of the present invention. The noise eliminating device 200 is equipped with a CPU 19 which controls each device in a concentrated manner. A ROM 21 and a RAM 20 are connected to the CPU 19 by a bus 27 in order to constitute a microcomputer. The ROM 21 is a read-only memory which stores BIOS and so forth. The RAM 20 writably stores various kinds of data and serves as a work area for the CPU 19. Furthermore, a HDD 25, a CD-ROM driver 22, a memory card driver 23 and an interface (I/F) 26 are connected to the bus 27. The HDD 25 stores a control program. The CD-ROM drive 22 reads a CD-ROM 110. The memory card driver 23 reads a memory card 24. The interface (I/F) 26 controls communications with a printer and so forth.

The CD-ROM 110 as shown in FIG. 10 serves as an exemplary storage medium of the present invention, and stores a predetermined control program. The CPU 19 reads the control program stored in the CD-ROM 110 using the CD-ROM driver 22, and installs the control program in the HDD 25. Thereby, it may be possible to perform various kinds of processing described later, for example. As a storage medium, in addition to the CD-ROM, various types of media, for example, optical disks such as a DVD, magneto-optical discs, magnetic disks such as a floppy (registered trade mark) disk, a semiconductor memory and so froth may be utilized. It may be also possible to download a program from a network such as the Internet and to install the program in the HDD 25. In this case, a storage device which stores programs by a server on a transmitting side is considered as the storage medium of the present invention. The program may be operable on a predetermined operating system (OS). In this case, the program may allow the operating system to perform a part of the later described various kinds of processing. The program may be included as a part of program files which constitute predetermined application software such as word-processing software, and the operating system.

Image data taken by the imaging apparatus 100 of FIG. 1 is input to the noise eliminating device 200 of FIG. 11 by a memory card 24, or may be input from the network through the interface 26. In the image data, a manufacturer and an equipment number of the imaging apparatus 100, an exposure time and temperature at the time of shooting, and the status of continuous shooting at the time of shooting, and so forth are stored. For example, such image data is exchangeable image file format (Exif) data. An image correction program is loaded in the RAM 20. Then, the noise eliminating device 200 reads attribute information from the image data in order to load the optimum parameters for the noise elimination corresponding to the shooting conditions stored in the HDD 25 to the RAM 20. Subsequently, the noise elimination processing is performed.

According to the above-described exemplary embodiments of the present invention, the noise eliminating mechanism includes a noise model determining mechanism, a noise detection mechanism and a pixel interpolation mechanism so that the noise which is generated due to a long exposure time may be eliminated in a short period of time and may assuredly be eliminated. The noise model determining mechanism determines the noise model based on the noise characteristics. The noise detection mechanism detects the noise in the pixels based on the noise model determined by the noise model determining mechanism. The pixel interpolation mechanism interpolates the detected noise based on the level of the pixels surrounding the noise or the pixels in a predetermined area.

Furthermore, the noise model is constituted by the bright-spot model, the black-spot model and the normal model so that the noise elimination may be performed according to the noise characteristics. The bright-spot model is a model in which the level of the noise pixel shows a greater value than that of the pixels surrounding the noise pixel. The black-spot model is a model in which the level of the noise pixel shows a smaller value than that of the pixels surrounding the noise pixels. The normal model is a model in which both the bright-spot model and the black-spot model exist.

In a case where all the differences between the target pixel level and the surrounding pixel levels are greater than the first preset threshold level, and the differences between the levels of the surrounding pixels are smaller than the second preset threshold level, the noise detection mechanism detects the target pixel as a noise. Accordingly, the noises in the bright-spot model and the black-spot model are accurately detected from the surrounding pixels.

In the pixel interpolation mechanism, the target pixel is interpolated by the pixel level given by $I_O=(I_A+I_B)/2$, where the level of pixels surrounding the target pixel is $I_A$ and $I_B$. Therefore, a significant difference may not be generated between the levels of the noise pixels and the surrounding pixels. Furthermore, the noise elimination mechanism sets each parameter to an optimum value based on the shooting conditions that are subject to change depending on the exposure time, the temperature at the time of shooting and the shooting mode in order to eliminate the noise. Accordingly, parameters may automatically be set in accordance with changes in the shooting conditions. Furthermore, when the noise eliminating method of the present invention is programmed according to an operating system (OS) which is controllable by a computer, the noise eliminating program may be controlled by the same processing method as long as the same OS is installed in the computer. When the noise eliminating program is stored in a storage medium in a format readable by the computer, the recording medium may be carried, and the program may be executed at any place.

Exemplary embodiments of this invention may be conveniently implemented using a conventional general purpose digital computer programmed according to the teachings of the present specification. Appropriate software coding can readily be prepared by programmers based on the teachings of the present disclosure. Exemplary embodiments of the present invention may also be implemented by the preparation of application specific integrated circuits or by interconnecting an appropriate network of conventional component circuits, as will be readily apparent to those skilled in the art.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods, when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A noise eliminating device, comprising:
   a noise eliminating mechanism to eliminate an isolated noise in an image being photographed, the noise eliminating mechanism including
   a noise pixel detection mechanism to detect a noise pixel by scanning the image, wherein the noise pixel is determined to be noise based on a comparison of a first difference with a first threshold and a comparison of a second difference with a second threshold, the first difference being a difference between a level of the noise pixel and the level of a pixel different from the noise pixel and located in a predetermined area of the image, and the second difference being a difference between the level of the pixel located in the predetermined area of the image and the level of another pixel different from the noise pixel and located in the predetermined area of the image; and
   a pixel correction mechanism to correct the level of the detected noise pixel based on the level of the pixel located in the predetermined area of the image with respect to the noise pixel.

2. The noise eliminating device according to claim 1, wherein the noise pixel detection mechanism detects a target pixel as the noise pixel, when a difference between the level of the target pixel and the level of the pixel located in the predetermined area from the target pixel is greater than a first preset threshold level, and when a difference between the levels of pixels surrounding the target pixel is smaller than a second preset threshold level.

3. The noise eliminating device according to claim 1, wherein the pixel correction mechanism corrects the noise pixel level using a mean value of the levels of a plurality of pixels located in the predetermined area from the noise pixel.

4. The noise eliminating device according to claim 1, wherein the noise pixel detection mechanism determines the predetermined area based on shooting conditions at the time when the image is photographed.

5. The noise eliminating device according to claim 4, wherein the shooting conditions include at least one of an exposure time and a temperature at the time of shooting, and a sensitivity of an imaging device.

6. A noise eliminating method for eliminating an isolated noise in an image being photographed, comprising:
   detecting a noise pixel by scanning the image, wherein the noise pixel is determined to be noise based on a comparison of a first difference with a first threshold and a comparison of a second difference with a second threshold, the first difference being a difference between a level of the noise pixel and the level of a pixel different from the noise pixel and located in a predetermined area of the image, and the second difference being a difference between the level of the pixel located in the predetermined area of the image and the level of another pixel different from the noise pixel and located in the predetermined area of the image; and
   correcting the level of the detected noise pixel based on the level of the pixel located in the predetermined area of the image with respect to the noise pixel.

7. The noise eliminating method according to claim 6, wherein detecting the noise pixel comprises detecting a target pixel as the noise pixel, if a difference between the level of the target pixel and the level of the pixel located in the predetermined area from the target pixel is greater than a first preset threshold level, and also if a difference between the levels of pixels surrounding the target pixel is smaller than a second preset threshold level.

8. The noise eliminating method according to claim 6, wherein correcting the level of the detected noise pixel comprises correcting the noise pixel level using a mean value of the levels of a plurality of pixels located in the predetermined area from the noise pixel.

9. The noise eliminating method according to claim 6, wherein detecting the noise pixel comprises defining the predetermined area based on shooting conditions at the time when the image is photographed.

10. The noise eliminating method according to claim 9, wherein the shooting conditions includes at least one of an exposure time and temperature at the time of shooting, and sensitivity of an imaging device.

11. A non-transitory computer program product for detecting and eliminating a noise pixel, stored on a computer readable storage medium to execute following method on the computer, the method comprising:
    detecting a noise pixel by scanning the image, wherein the noise pixel is determined to be noise based on a comparison of a first difference with a first threshold and a comparison of a second difference with a second threshold, the first difference being a difference between a level of the noise pixel and a pixel different from the noise pixel and located in a predetermined area of the image, and the second difference being a difference between the level of the pixel located in the predetermined area of the image and the level of another pixel different from the noise pixel and in the predetermined area of the image; and
    correcting the level of the detected noise pixel based solely on the level of the pixel located in the predetermined area of the image with respect to the noise pixel.

12. The computer program product according to claim 11, wherein detecting the noise level comprises detecting a target pixel as the noise pixel, if a difference between the level of the target pixel and the level of the pixel located in the predetermined area away from the target pixel is greater than a first preset threshold level, and also if a difference between the levels of pixels surrounding the target pixel is smaller than a second preset threshold level.

13. The computer program product according to claim 11, wherein correcting the level of the detailed noise pixel comprises correcting the noise pixel level using a mean value of the levels of a plurality of pixels located in the predetermined area with respect to the noise pixel.

14. The computer program product according to claim 11, wherein detecting the noise pixel comprises defining the predetermined area based on shooting conditions at the time when the image is photographed.

15. The computer program product according to claim 14, wherein the shooting conditions include at least one of an exposure time and temperature at the time of shooting, and sensitivity of an imaging device.

16. The noise eliminating device according to claim 1, wherein both the pixel in the predetermined area of the image and the another pixel in the predetermined area of the image are immediately adjacent to the noise pixel.

17. The noise eliminating method according to claim 6, wherein both the pixel in the predetermined area of the image and the another pixel in the predetermined area of the image are immediately adjacent to the noise pixel.

18. The computer program product according to claim 11, wherein both the pixel in the predetermined area of the image and the another pixel in the predetermined area of the image are immediately adjacent to the noise pixel.

* * * * *